(12) United States Patent
Lee (10) Patent No.: US 7,755,681 B2
(45) Date of Patent: Jul. 13, 2010

(54) APPARATUS AND METHOD OF GAMMA CORRECTION IN DIGITAL IMAGE PROCESSING DEVICE

(75) Inventor: Jong-hwan Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 636 days.

(21) Appl. No.: 11/500,847

(22) Filed: Aug. 7, 2006

(65) Prior Publication Data

US 2007/0273776 A1 Nov. 29, 2007

(30) Foreign Application Priority Data

May 29, 2006 (KR) .................. 10-2006-0048286

(51) Int. Cl.
*H04N 5/202* (2006.01)
*H04N 5/228* (2006.01)
*H04N 9/68* (2006.01)
*H04N 5/217* (2006.01)
*H04N 9/73* (2006.01)
*G03F 3/08* (2006.01)

(52) U.S. Cl. ............... 348/254; 348/222.1; 348/234; 348/241; 348/223.1; 358/518; 358/519

(58) Field of Classification Search ......... 348/234–254; 396/72; 358/522
See application file for complete search history.

(56) References Cited

U.S. PATENT DOCUMENTS

| | | | |
|---|---|---|---|
| 7,369,183 B2* | 5/2008 | Oka et al. .................. 348/674 |
| 7,463,295 B2* | 12/2008 | Asada et al. ................ 348/254 |
| 2001/0035850 A1* | 11/2001 | Okamoto et al. ............. 345/77 |
| 2003/0174886 A1* | 9/2003 | Iguchi et al. ................ 382/167 |
| 2004/0234155 A1* | 11/2004 | Hoshuyama ................ 382/254 |
| 2005/0062854 A1* | 3/2005 | Shiraishi .................. 348/222.1 |
| 2006/0001748 A1* | 1/2006 | Kamon et al. ............... 348/234 |
| 2006/0023273 A1* | 2/2006 | Kato ......................... 358/519 |
| 2006/0061842 A1* | 3/2006 | Oka et al. .................. 358/522 |
| 2006/0062558 A1* | 3/2006 | Kato et al. .................... 396/72 |
| 2006/0176407 A1* | 8/2006 | Ikeda et al. ................ 348/674 |
| 2007/0046827 A1* | 3/2007 | Harada ...................... 348/672 |
| 2007/0092136 A1* | 4/2007 | Zhao et al. ................. 382/169 |

FOREIGN PATENT DOCUMENTS

| | | |
|---|---|---|
| JP | 2003-122336 A | 4/2003 |
| JP | 2003-304398 A | 10/2003 |

* cited by examiner

*Primary Examiner*—Jason Chan
*Assistant Examiner*—Michael Osinski
(74) *Attorney, Agent, or Firm*—Drinker Biddle & Reath LLP (57) ABSTRACT

Provided are an apparatus and method of gamma correction, and more particularly, an apparatus and method for varying a gamma curve according to a brightness level of a detected image signal to adaptively perform gamma correction, in a digital image processor. The gamma correction apparatus in the digital image processor includes a brightness level detector detecting a brightness level from an image signal generated by capturing an image, a gamma curve calculator moving a start point and/or an end point of an existing gamma curve for correcting an input brightness level to a predetermined output brightness level, according to the detected brightness level, and calculating a new gamma curve, and a gamma corrector correcting an input brightness level of the image signal using the new gamma curve, and outputting the corrected brightness level.

8 Claims, 9 Drawing Sheets

APPARATUS AND METHOD OF GAMMA CORRECTION IN DIGITAL IMAGE PROCESSING DEVICE

CROSS-REFERENCE TO RELATED PATENT APPLICATION

This application claims the benefit of Korean Patent Application No. 10-2006-0048286, filed on May 29, 2006, in the Korean Intellectual Property Office, the disclosure of which is incorporated herein in its entirety by reference.

BACKGROUND OF THE INVENTION

1. Field of the Invention

The present invention relates to an apparatus and a method of gamma correction, and more particularly, to an apparatus and a method for applying a gamma curve varied according to a brightness level of a detected image signal to adaptively perform a gamma correction in a digital image processor.

2. Description of the Related Art

Human eyes react non-linearly with respect to brightness according to Weber's law. For this reason, when a relatively limited bit depth such as 8 bits for each channel is provided, linearly encoding the brightness of light causes posterization. Accordingly, in order to achieve high picture quality when an arbitrary bit depth is given, encoding using a non-linear function is needed. As such, encoding information taking into account the nonlinearity of human's eyes is called "gamma correction". In the case of a conventional digital image processor, when raw data generated by a captured image is image-processed into Joint Photographic coding Experts Group (JPEG) data or Tagged Image File Format (TIFF) data, gamma correction is performed.

Figure 1:
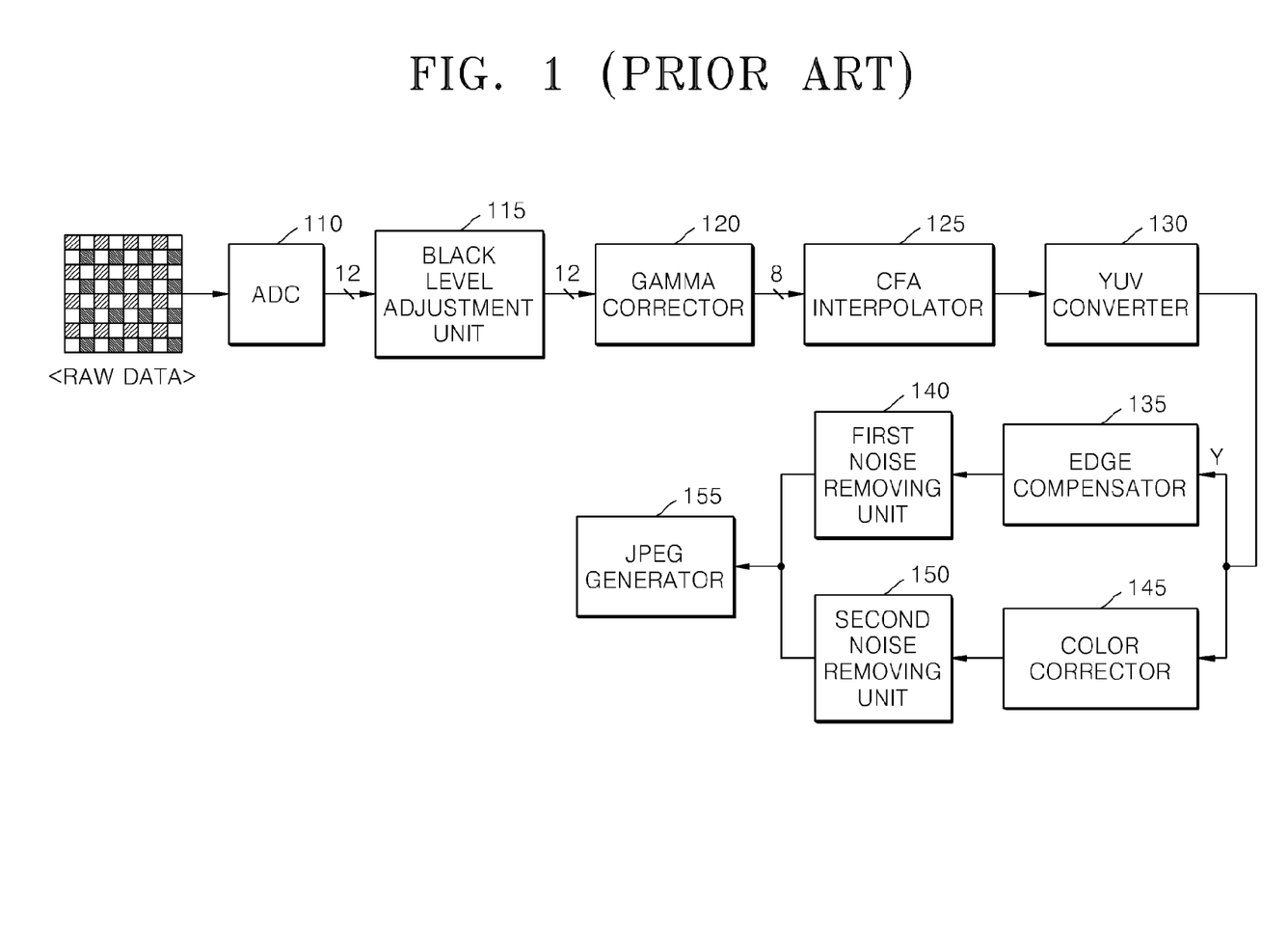
FIG. 1 is a block diagram of a gamma correction apparatus included in a conventional digital image processor.

FIG. 1 is a block diagram of a gamma correction apparatus included in a conventional digital image processor.

Referring to FIG. 1, 12-bit (also, 10-bit or 16-bit) raw data acquired by a charge-coupled device (CCD) filter (not shown) and a color filter array (CFA) filter (not shown) is digitized by an analog-to-digital converter (ADC) 110.

Components used in the CCD and CFA filters are sensitive to a change in temperature and generate a dark current according to the change in temperature, resulting in an undesired black level being included in an image signal. A black level adjustment unit 115 removes such a black level generated by the dark current.

Figure 2:
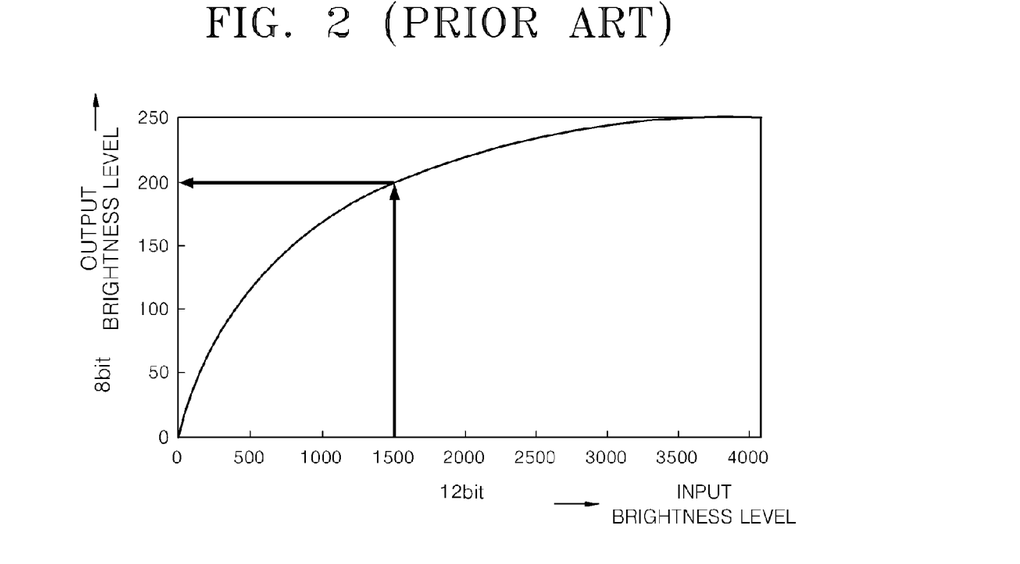
FIG. 2 is an example of a gamma curve applied when gamma correction is performed by the gamma correction apparatus as illustrated in FIG. 1.

A gamma correction unit 120 corrects an input brightness level of a 12-bit image signal input by a gamma curve to an 8-bit brightness level, and outputs the 8-bit brightness level. FIG. 2 is a graph illustrating a gamma curve applied when gamma correction is performed by the gamma correction apparatus shown in FIG. 1. For example, a brightness level 1500 of the 12-bit image signal is corrected to a brightness level 200 of an 8-bit image signal by the gamma curve.

A CFA interpolator 125 interpolates a bayer pattern implemented by RGRG lines and GBGB lines of the gamma-corrected 8-bit data into RGB lines. The CFA interpolator 125 performs color interpolation by first restoring G channels from pixels having only R or B channel values, and then filling B and R channel values in empty areas in this order or in an inverse order, thus restoring three channels of R, G, and B.

A YUV converter 130 converts the interpolated RGB signal into a YUV signal.

An edge compensator 135 filters Y signals using a high-pass filter (HPF) so as to enhance the sharpness of images. A first noise removing unit 140 removes noise from the filtered Y signals.

A color corrector 145 corrects color values of U and V signals using a standard color coordinate system. The second noise removing unit 150 removes noise from the U and V signals, the color values of which are corrected.

A Joint Photographic coding Experts Group (JPEG) generator 155 compresses and signal-processes the YUV signals whose noise have been removed, and generates a JPEG file. The JPEG file is stored in a memory (not shown).

Figure 3:
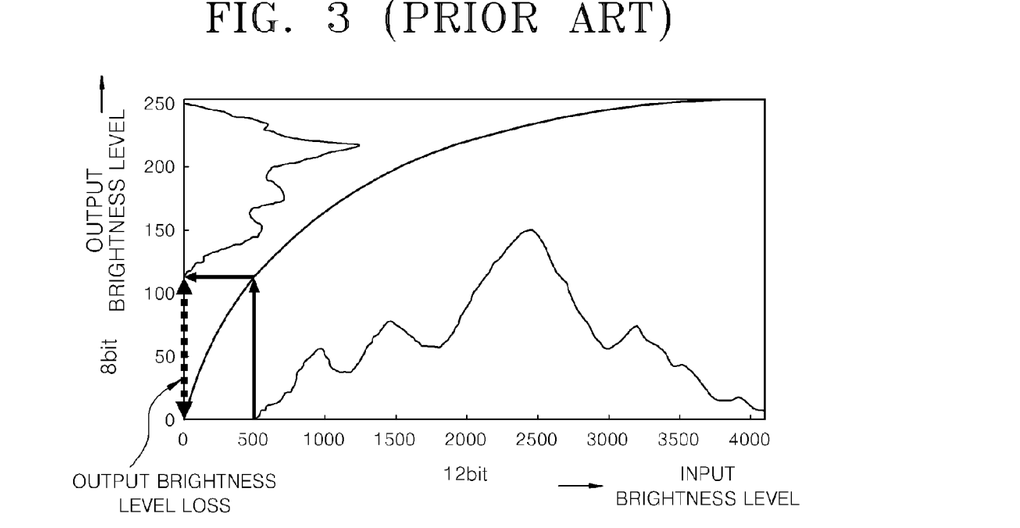
FIG. 3 is a view showing loss of image data with respect to output signal levels when gamma correction is performed by the gamma correction apparatus as illustrated in FIG. 1.

However, when the exposure of images photographed by the digital image processor is too long or when there is no signal corresponding to low brightness in a specific scene, performing gamma correction using the gamma curve illustrated in FIG. 2 causes great loss of image data at low brightness along an output brightness level axis as illustrated in FIG. 3, so that stable images cannot be acquired.

Likewise, when there is no signal corresponding to high brightness in photographed images, performing gamma correction using the gamma curve illustrated in FIG. 2 causes great loss of image data at high brightness along the output brightness level axis, so that stable images cannot be acquired.

SUMMARY OF THE INVENTION

The present invention provides a gamma correction apparatus and method of varying a gamma curve according to a brightness level of a detected image signal to adaptively perform gamma correction, in a digital image processor.

According to an aspect of the present invention, a gamma correction apparatus in a digital image processor comprises: a brightness level detector detecting a brightness level from an image signal generated by capturing an image; a gamma curve calculator moving a start point and/or an end point of an existing gamma curve for correcting an input brightness level to a predetermined output brightness level, according to the detected brightness level, and calculating a new gamma curve; and a gamma corrector correcting an input brightness level of the image signal using the new gamma curve, and outputting the corrected brightness level.

According to another aspect of the present invention, a gamma correction apparatus in a digital image processor comprises: a lowest brightness level detector detecting a lowest brightness level from an image signal generated by capturing an image; a gamma curve calculator moving a start point of an existing gamma curve for correcting an input brightness level to a predetermined output brightness level, according to the detected lowest brightness level or below the detected lowest brightness level, and calculating a new gamma curve; and a gamma corrector correcting an input brightness level of the image signal using the new gamma curve, and outputting the corrected brightness level.

According to another aspect of the present invention, a gamma correction apparatus in a digital image processor comprises: a brightness level detector detecting a lowest brightness level and a highest brightness level from an image signal generated by capturing an image; a gamma curve calculator moving a start point and an end point of an existing gamma curve for correcting an input brightness level to a predetermined output brightness level, according to the detected lowest brightness level and detected highest brightness level or below the detected lowest brightness level and detected highest brightness level, and calculating a new gamma curve; and a gamma corrector correcting an input brightness level of the image signal using the new gamma curve, and outputting the corrected brightness level.

According to another aspect of the present invention, a method of correcting gamma in a digital image processor comprises: detecting a brightness level from an image signal generated by capturing an image; moving a start point and/or an end point of an existing gamma curve for correcting an input brightness level to a predetermined output brightness level, according to the detected brightness level, and calculating a new gamma curve; and correcting a brightness level of the image signal using the new gamma curve, and outputting the corrected brightness level.

According to another aspect of the present invention, a method of correcting gamma in a digital image processor comprises: detecting a lowest brightness level from an image signal generated by capturing an image; moving a start point of an existing gamma curve for correcting an input brightness level to a predetermined output brightness level, according to the detected lowest brightness level or below the detected lowest brightness level, and calculating a new gamma curve; and correcting an input brightness level of the image signal using the new gamma curve, and outputting the corrected brightness level.

According to another aspect of the present invention, a method of correcting gamma in a digital image processor comprises: detecting a highest brightness level from an image signal generated by capturing an image; moving an end point of an existing gamma curve for correcting an input brightness level to a predetermined output brightness level, according to the detected highest brightness level or below the detected highest brightness level, and calculating a new gamma curve; and correcting a brightness level of the image signal using the new gamma curve, and outputting the corrected brightness level.

According to another aspect of the present invention, a method of correcting gamma in a digital image processor comprises: detecting a lowest brightness level and a highest brightness level from an image signal generated by capturing an image; moving a start point and an end point of an existing gamma curve for correcting an input brightness level to a predetermined output brightness level, according to the detected lowest brightness level and the detected highest brightness level or below the detected lowest brightness level and the detected highest brightness level, and calculating a new gamma curve; and correcting an input brightness level of the image signal using the new gamma curve, and outputting the corrected brightness level.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the appended drawings. The drawings show, and the detailed description provides, by way of illustration, specific illustrative embodiments of the invention. These embodiments are described in sufficient detail to enable those skilled in the art to practice the invention. Of course, other embodiments may be used and various changes may be made without departing from the scope of the present invention. Therefore, the following exemplary detailed description is not to be taken in a limiting sense.

Figure 4:
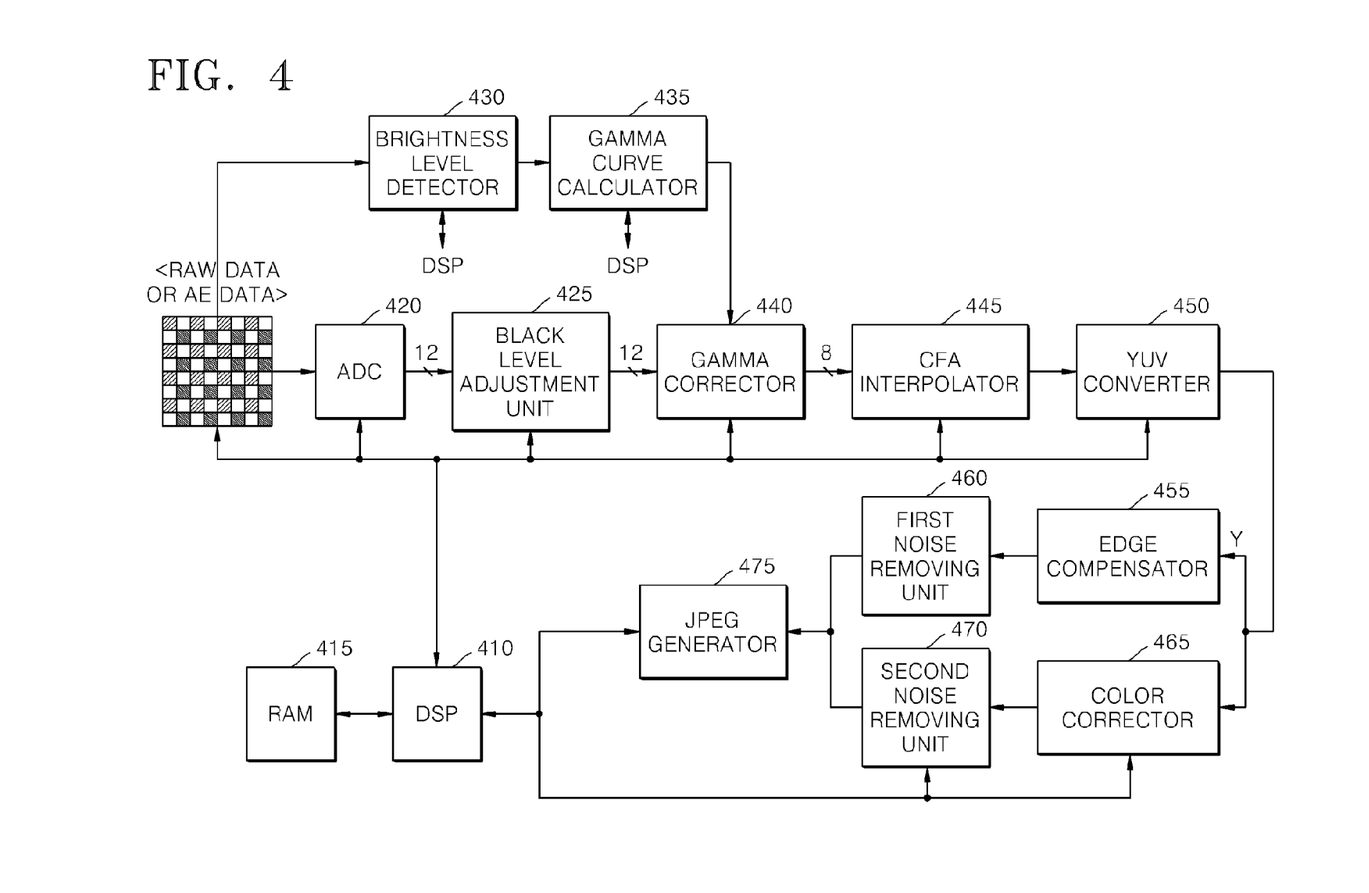
FIG. 4 is a block diagram of a gamma correction apparatus included in a digital image processor, according to an embodiment of the present invention.

FIG. 4 is a block diagram of a gamma correction apparatus included in a digital image processor according to an embodiment of the present invention. The gamma correction apparatus includes a digital signal processor (DSP) 410, a random access memory (RAM) 415, an analog-to-digital converter (ADC) 420, a black level adjustment unit 425, a brightness level detector 430, a gamma curve calculator 435, a gamma corrector 440, a color filter array (CFA) interpolator 445, a YUV converter 450, an edge compensator 455, a first noise removing unit 460, a color corrector 465, a second noise removing unit 470, and a JPEG generator 475. The specific types of components and their specific arrangement shown in FIG. 4 may be varied in alternative embodiments.

Digital cameras acquire images by a charge-coupled device (CCD) which converts light reflected from an object into an electric signal. In order to acquire color images using such a CCD, a color filter is required and a CFA is mainly used as the color filter. Of course, other types of filters may be used.

The CFA passes only light representing a certain color for each pixel, has a regularly arranged structure, and has various shapes according to its structure.

Raw data acquired by the CCD and the CFA is stored in the RAM 415 under the control of the DSP 410. The ADC 420 converts 12 bits of raw data acquired through the CCD and CFA into digital data. In the current embodiment, 12 bits of raw data is used, however, the invention is not limited to this number, and 10 bits or 16 bits of raw data, as well as other numbers of bits of data may be used.

A dynamic temperature range of an image sensor such as the CCD is generally between 0° C. and 40° C. However, the image sensor must normally operate even at temperatures higher than 60° C. in a mobile device or in a specific environment. Moreover, since the image sensor is composed of semiconductor devices, a current component due to heat is generated at high temperatures. Accordingly, when such a current, as for example, a dark current, is generated, the image sensor receives a signal component other than components related to optical factors, so that a part of a signal is detected even in a very dark environment, such as, for example, when no light exists. The part of the signal that is heat noise and system noise is called a black level and is a most important factor among noise components of an image sensor.

The black level adjustment unit 425 removes a black level generated by a dark current and the removal is performed under the control of the DSP 410.

Figure 5:
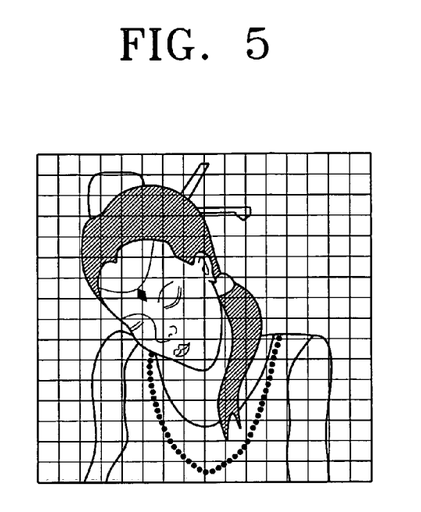
FIG. 5 is a view for explaining Auto Exposure (AE) data used when gamma correction is performed by the gamma correction apparatus as illustrated in FIG. 4.

The brightness level detector 430 detects a brightness level from raw data stored in the RAM 415 under the control of the DSP 410. Raw data for each pixel is stored in a predetermined area of the RAM 415. The brightness level detector 430 detects a lowest brightness level and/or a highest brightness level from the raw data for each pixel. Auto Exposure (AE) data for the photographed images is stored in a different area of the RAM 415. The AE data, an example of which is illustrated in FIG. 5, is obtained by dividing the raw data into a plurality of blocks and calculating an average brightness level of a plurality of pixel data included in each block. The brightness level detector 430 detects a lowest brightness level and/or a highest brightness level from the AE data. Accordingly, the brightness level detector 430 may be a lowest brightness level detector (not shown), a highest brightness level detector (not shown), or a lowest and highest brightness level detector (not shown). The gamma curve calculator 435 moves a start point and/or an end point of an existing gamma curve according to the brightness level detected by the brightness level detector 430, and calculates a new gamma curve.

The control for calculating the new gamma curve is performed by the DSP 410. The DSP 410 applies the existing gamma curve to a photographed image signal (raw data or AE data), and determines whether data of a predetermined low and/or high brightness area exists, thereby controlling the calculation of the new gamma curve.

Figure 6A:
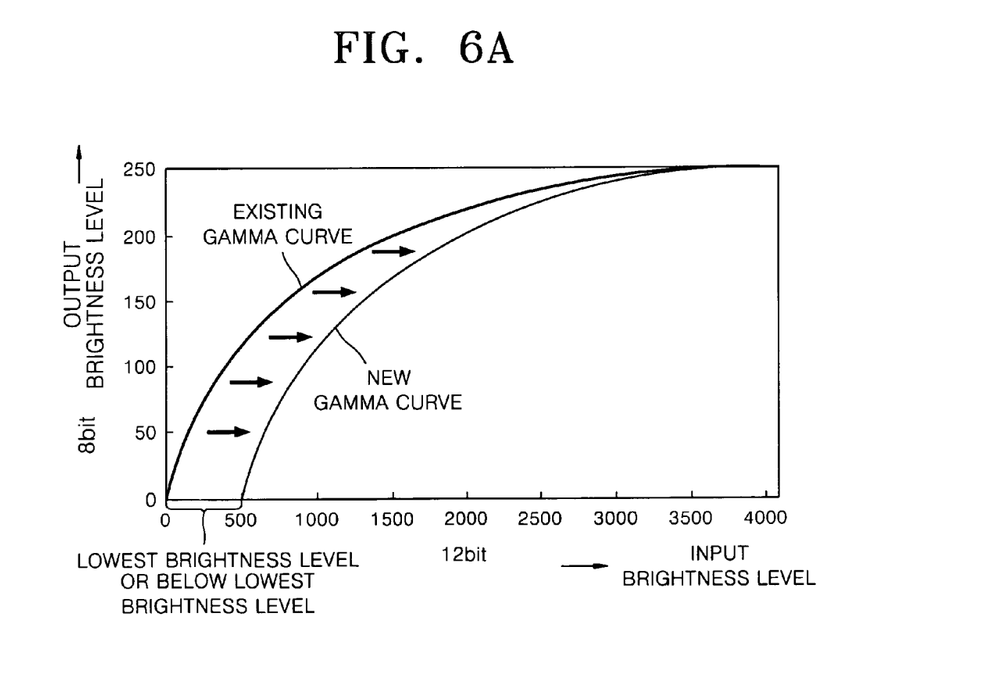
FIGS. 6A, 6B, and 6C are graphs illustrating relationships of new gamma curves with respect to existing gamma curves.
Figure 6B:
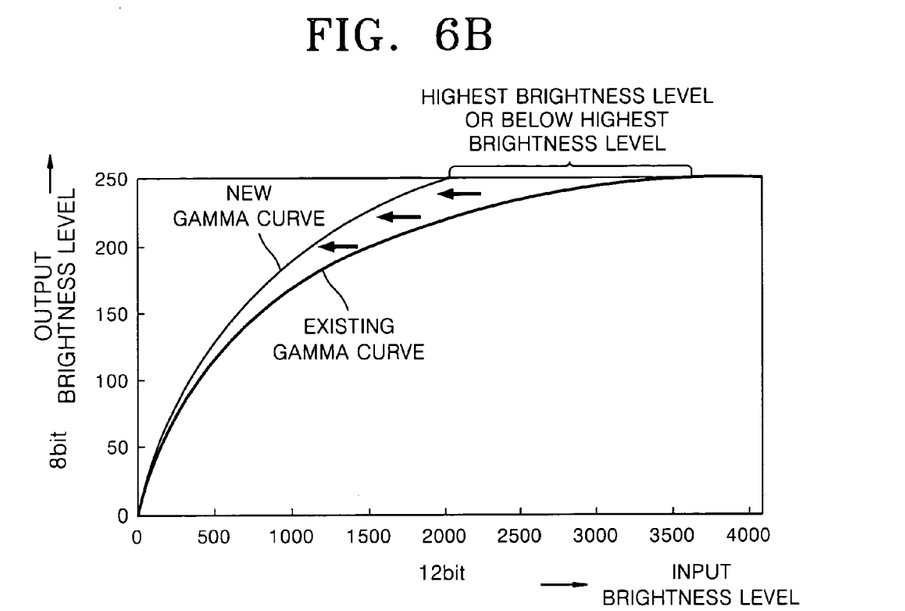
Figure 6C:
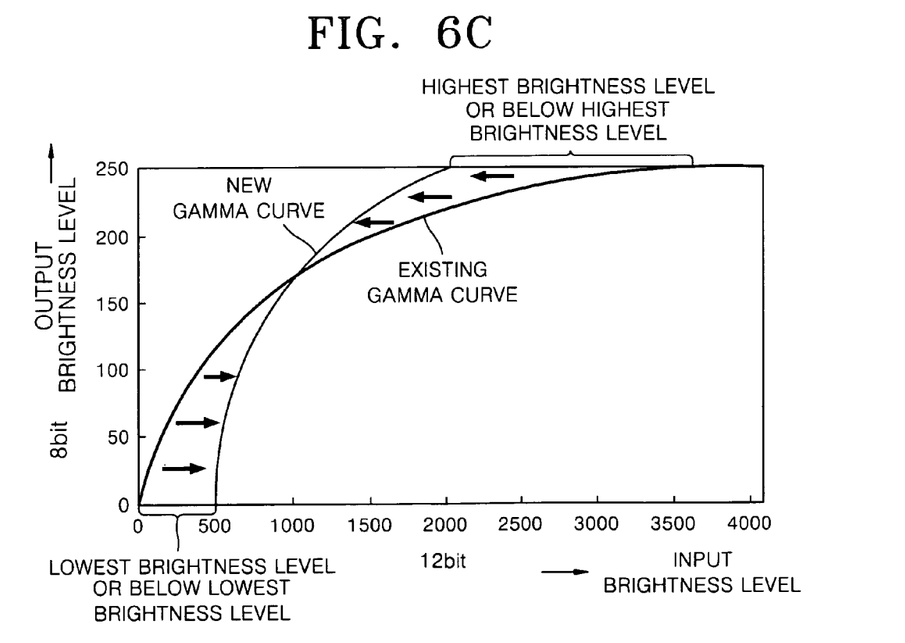

If data of a predetermined low brightness area exists, the gamma curve calculator 435 detects a lowest brightness level and moves a start point of the existing gamma curve according to the detected lowest brightness level and thus calculates the new gamma curve, under the control of the DSP 310, as illustrated in FIG. 6A. Alternatively, if data of a predetermined high brightness area exists, the gamma curve calculator 435 detects a highest brightness level and moves an end point of the existing gamma curve according to the detected highest brightness level and thus calculates the new gamma curve, under the control of the DSP 310, as illustrated in FIG. 6B. Alternatively, if data of a predetermined low and high brightness areas exists, the gamma curve calculator 435 detects lowest and highest brightness levels and moves a start point and an end point of the existing gamma curve according to the detected lowest and highest brightness levels and thus calculates the new gamma curve, under the control of the DSP 310, as illustrated in FIG. 6C.

In the current embodiment, the moving distance of the start point and/or the end point of the existing gamma curve are set to the lowest and/or highest brightness level. However, in order to prevent a sharp change in picture quality, the moving distance can be set lower than the lowest and/or highest brightness level, for example, to ½ or ⅓ of the lowest and/or highest brightness level.

The gamma curve is stored in a lookup table (LUT) format in a predetermined area of the RAM 415. The new gamma curve is stored in a different area of the RAM 415, or the existing gamma curve is updated to the new gamma curve.

Figure 7:
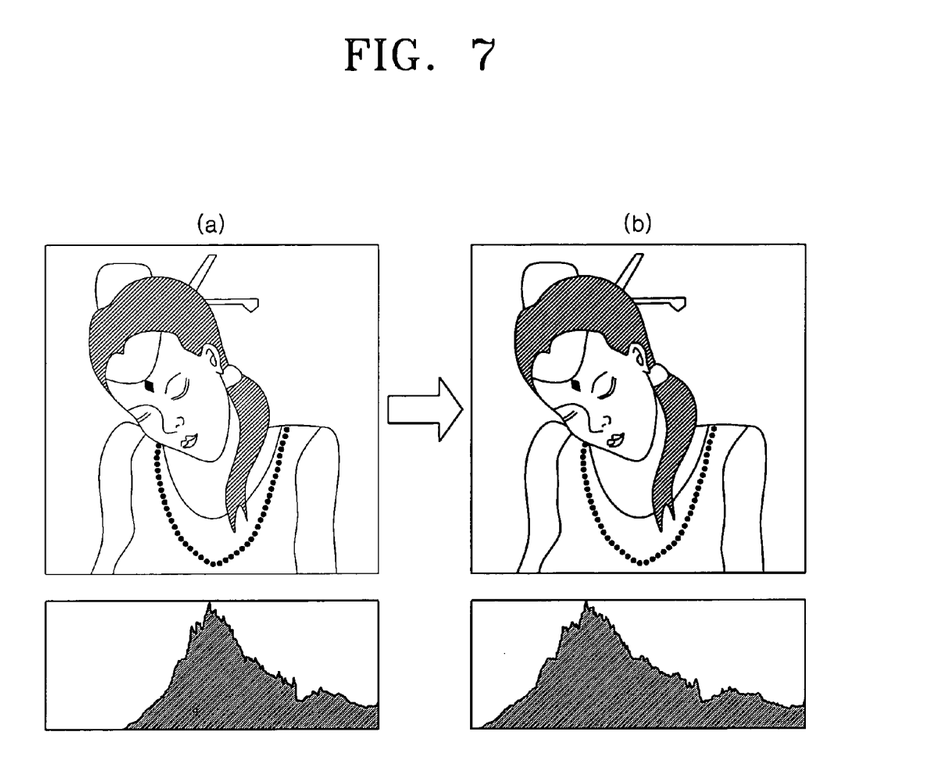
FIG. 7 illustrates an image gamma-corrected by the gamma correction apparatus as illustrated in FIG. 1, and an image gamma-corrected by the gamma correction apparatus as illustrated in FIG. 4.

The gamma corrector 440 corrects an input brightness level of a 12-bit image signal input by the new gamma curve, into an 8-bit brightness level, and outputs the 8-bit brightness level. FIG. 7A illustrates an image gamma-corrected using the existing gamma curve, and FIG. 7B illustrates an image gamma-corrected using the new gamma curve, that is, an image obtained by detecting a lowest brightness level, moving a start point of the existing gamma curve according to the lowest brightness level or below the lowest brightness level, and performing gamma-correction.

Comparing FIG. 7A with FIG. 7B, the image illustrated in FIG. 7B is clearer than that illustrated in FIG. 7A, as no loss exists in the output brightness levels.

The CFA interpolator 445 interpolates a bayer pattern implemented by RGRG lines and GBGB lines of the 8 bits of data gamma-corrected under the control of the DSP 410, into RGB lines.

The CFA interpolator 125 performs color interpolation by first restoring G channels from pixels having only R or B channel values, and then filling B and R channel values in empty areas in this order or in an inverse order, thus restoring three channels of R, G, and B.

In the current embodiment, after gamma correction is performed, CFA interpolation is performed. However, it is also possible that after CFA interpolation is performed, gamma correction is performed. That is, data gamma correction can be performed on 12 bits of data subjected to CFA interpolation.

The YUV converter 450 converts the RGB signal interpolated by the control of the DSP 410 into a YUV signal. The YUV converter 450 multiplies each RGB signal by proper coefficients and then adds or subtracts three terms, in order to convert the interpolated RGB signal into the YUV signal. For example, Equation Y =0.299 R+0.598 G+0.114 B, Equation U=−0.147 R−0.289 G+0.436 B, and Equation V=0.615 R−0.515 G−0.100 B, can be used.

The edge compensator 455 filters a Y signal converted by a HPF under the control of the DSP 410, thereby enhancing the sharpness of an image. The first noise removing unit 460 removes noise from the Y signal.

The color corrector 465 corrects color values of the U and V signals using a standard color coordinate system, under the control of the DSP 410. The second noise removing unit 470 removes noise from the U and V signals whose color values are corrected.

The JPEG generator 475 compresses and signal-processes the Y, U, and V signals whose noise is removed, under the control of the DSP 410, and generates a JPEG file. The JPEG file is stored in the RAM 415.

Figure 8:
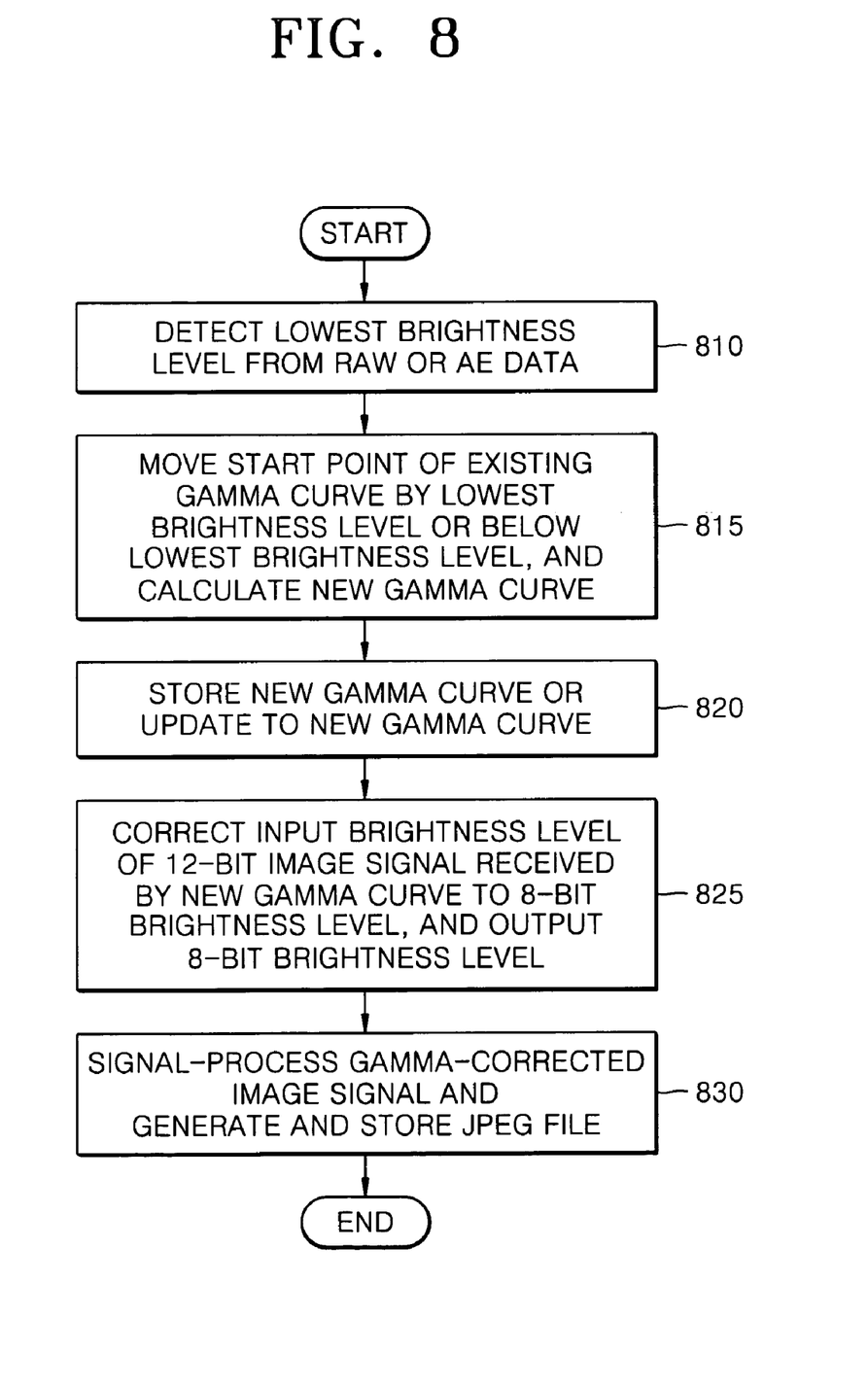
FIG. 8 is a flowchart illustrating a gamma correction method performed by a digital image processor, according to an embodiment of the present invention.

FIG. 8 is a flowchart illustrating a gamma correction method performed by the digital image processor, according to an embodiment of the present invention.

Referring to FIGS. 4 and 8, the brightness level detector 430 detects a lowest brightness level from raw or AE data (operation 810).

Then, the gamma curve calculator 435 moves a start point of an existing gamma curve according to the detected lowest brightness level or below the detected lowest brightness level, and calculates a new gamma curve (operation 815).

The DSP 410 stores the new gamma curve whose start point is moved within a predetermined area of the RAM 415, or updates the existing gamma curve to the new gamma curve (operation 820).

Then, the gamma corrector 440 corrects an input brightness level of a 12-bit image signal input by the new gamma curve into an 8-bit brightness level, and outputs the 8-bit brightness level (operation 825).

Then, the gamma-corrected image signal is signal-processed, so that a JPEG file is generated and stored in the RAM 415, under the control of the DSP 410 (operation 830).

Figure 9:
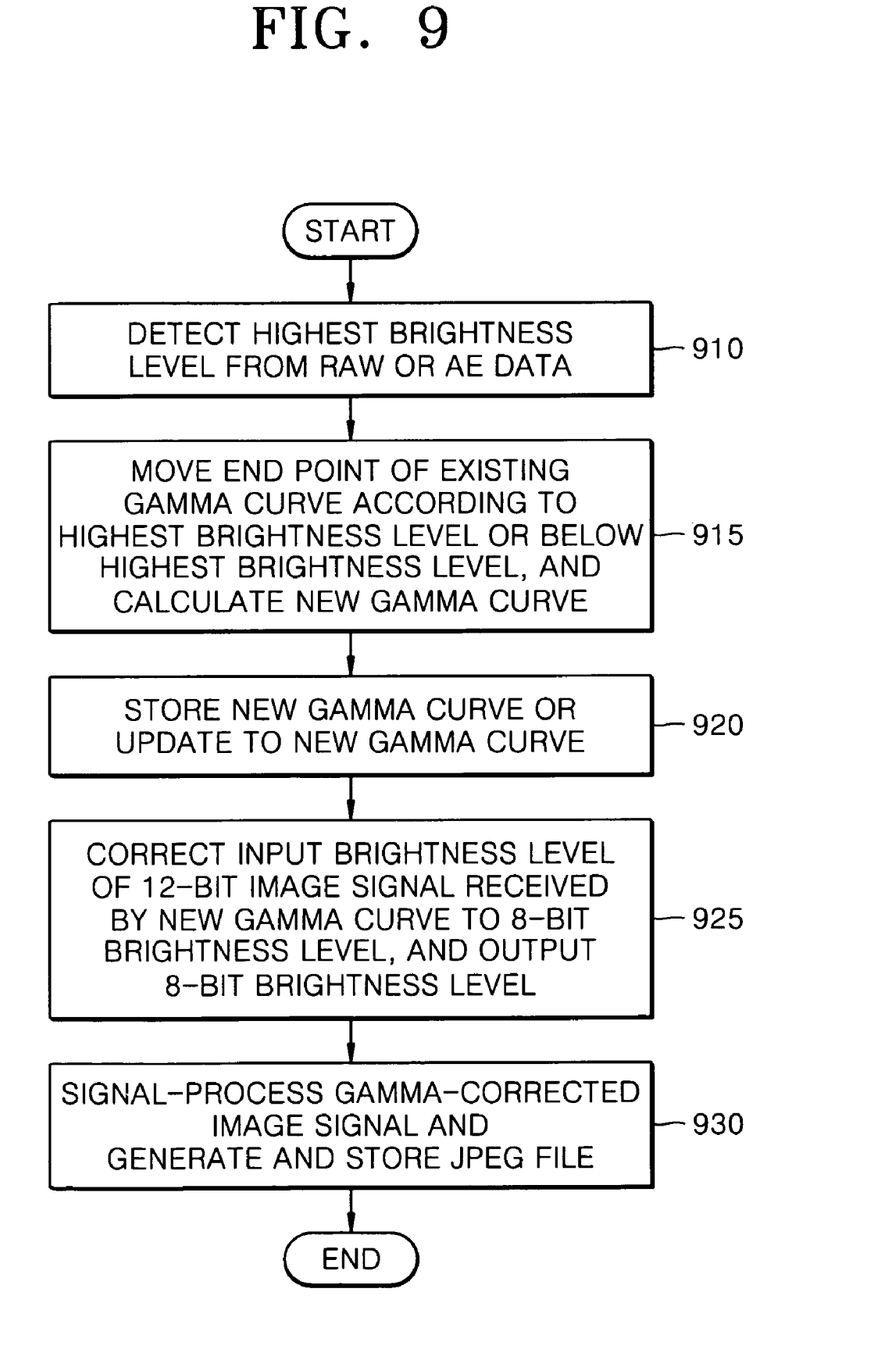
FIG. 9 is a flowchart illustrating a gamma correction method performed by a digital image processor, according to another embodiment of the present invention.

FIG. 9 is a flowchart illustrating a gamma correction method performed by a digital image processor, according to another embodiment of the present invention.

Referring to FIGS. 4 and 9, first, the brightness level detector 430 detects a highest brightness level from raw or AE data (operation 910).

The gamma curve calculator 435 moves an end point of an existing gamma curve according to the detected highest brightness level or below the detected highest brightness level, and calculates a new gamma curve (operation 915).

The DSP 410 stores the new gamma curve in a predetermined area of the RAM 415 or updates the existing gamma curve to the new gamma curve (operation 920).

Then, the gamma corrector 440 corrects an input brightness level of a 12-bit image signal input by the new gamma curve into an 8-bit brightness level, and outputs the 8-bit brightness level (operation 925).

The gamma-corrected image signal is signal-processed, so that a JPEG file is generated, under the control of the DSP 410. The JPEG file is stored in the RAM 415 (operation 930).

Figure 10:
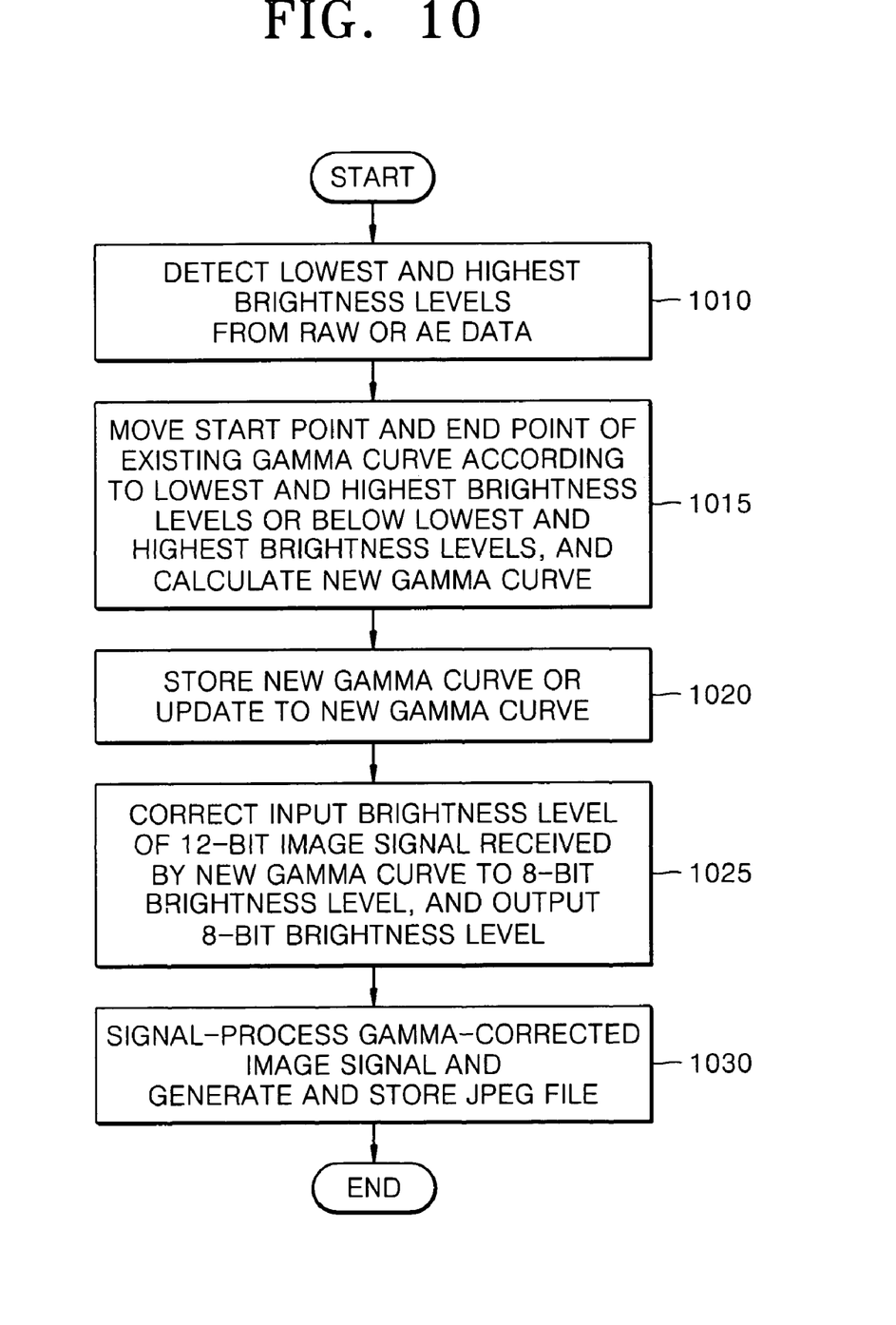
FIG. 10 is a flowchart illustrating a gamma correction method performed by a digital image processor, according to another embodiment of the present invention.

FIG. 10 is a flowchart illustrating a gamma correction method performed by a digital image processor, according to another embodiment of the present invention.

Referring to FIGS. 4 and 10, first, the brightness level detector 430 detects lowest and highest brightness levels from raw or AE data (operation 1010).

The gamma curve calculator 435 moves a start point and an end point of an existing gamma curve according to the detected lowest and highest brightness levels or below the detected lowest and highest brightness levels, and calculates a new gamma curve (operation 1015).

The DSP 410 stores the new gamma curve in a predetermined area of the RAM 415 or updates the existing gamma curve to the new gamma curve (operation 1020).

Then, the gamma corrector 440 corrects an input brightness level of a 12-bit image signal input by the new gamma curve into an 8-bit brightness level, and outputs the 8-bit brightness level (operation 1025).

Then, the gamma-corrected image signal is signal-processed, so that a JPEG file is generated and stored in the RAM 415, under the control of the DSP 410 (operation 1030).

As described above, according to the present invention, by varying a gamma curve, according to a brightness level of an image signal detected by a digital image processor, to adaptively perform gamma correction, it is possible to acquire clear images without any loss in output brightness levels.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A gamma correction apparatus in a digital image processor, comprising:
    a highest brightness level detector for detecting a highest brightness level from an image signal generated by capturing an image;
    a gamma curve calculator for moving, in accordance with at least one of the detected highest brightness level and a level below the detected highest brightness level, an end point of an existing gamma curve, the end point being moved by a distance less than or equal to a distance from the existing end point to the highest brightness level detected, so as to correct an input brightness level to a predetermined output brightness level according to at least one of the detected highest brightness level and the level below the detected highest brightness level, and calculating a new gamma curve; and
    a gamma corrector for correcting an input brightness level of the image signal using the new gamma curve, and outputting the corrected brightness level.

2. The gamma correction apparatus of claim 1, further comprising:
    a memory for storing the image signal and the existing gamma curve and the new gamma curve,
    wherein the new gamma curve is stored in at least one of an area of the memory containing the existing gamma curve, so as to update the existing gamma curve, or an area of the memory not containing the existing gamma curve.

3. A gamma correction apparatus in a digital image processor, comprising:
    a brightness level detector for detecting a lowest brightness level and a highest brightness level from an image signal generated by capturing an image;
    a gamma curve calculator for moving, in accordance with at least one of a first set of levels of the detected lowest brightness level and the detected highest brightness level and a second set of levels of a level below the detected lowest brightness level and a level below the detected highest brightness level, a start point and an end point of an existing gamma curve, the start point being moved by a distance less than or equal to a distance from the existing start point to the lowest brightness level detected and the end point being moved by a distance less than or equal to a distance from the existing end point to the highest brightness level detected, so as to correct an input brightness level to a predetermined output brightness level according to at least one of the first set of levels of the detected lowest brightness level and the detected highest brightness level and the second set of levels of the level below the detected lowest brightness level and the level below the detected highest brightness level, and calculating a new gamma curve; and
    a gamma corrector correcting an input brightness level of the image signal using the new gamma curve, and outputting the corrected brightness level.

4. The gamma correction apparatus of claim 3, further comprising:
    a memory for storing the image signal and the existing gamma curve and the new gamma curve,
    wherein the new gamma curve is stored in at least one of an area of the memory containing the existing gamma curve, so as to update the existing gamma curve, or an area of the memory not containing the existing gamma curve.

5. A method of correcting gamma in a digital image processor, comprising:
    detecting a highest brightness level from an image signal generated by capturing an image;
    moving, in accordance with at least one of the detected highest brightness level and a level below the detected highest brightness level, an end point of an existing gamma curve, the end point being moved by a distance less than or equal to a distance from the existing end point to the highest brightness level detected, so as to correct an input brightness level to a predetermined output brightness level according to at least one of the detected highest brightness level and the level below the detected highest brightness level, and calculating a new gamma curve; and correcting a brightness level of the image signal using the new gamma curve, and outputting the corrected brightness level.

6. The method of claim 5, wherein, after the moving of the start point of the existing gamma curve, the new gamma curve is stored in at least one of an area of the memory containing the existing gamma curve, so as to update the existing gamma curve, or an area of the memory not containing the existing gamma curve.

7. A method of correcting gamma in a digital image processor, comprising:

detecting a lowest brightness level and a highest brightness level from an image signal generated by capturing an image;

moving, in accordance with at least one of a first set of levels of the detected lowest brightness level and the detected highest brightness level and a second set of levels of a level below the detected lowest brightness level and a level below the detected highest brightness level, a start point and an end point of an existing gamma curve, the start point being moved by a distance less than or equal to a distance from the existing start point to the lowest brightness level detected and the end point being moved by a distance less than or equal to a distance from the existing end point to the highest brightness level detected, so as to correct an input brightness level to a predetermined output brightness level, according to at least one of the first set of levels of the detected lowest brightness level and the detected highest brightness level and the second set of levels of the level below the detected lowest brightness level and the level below the detected highest brightness level, and calculating a new gamma curve; and correcting an input brightness level of the image signal using the new gamma curve, and outputting the corrected brightness level.

8. The method of claim 7, wherein, after the moving of the start point and the end point of the existing gamma curve, the new gamma curve is stored in at least one of an area of the memory containing the existing gamma curve, so as to update the existing gamma curve, or an area of the memory not containing the existing gamma curve.

* * * * *